United States Patent [19]

McConnell

[11] 3,907,521

[45] Sept. 23, 1975

[54] DIELECTROPHORETIC SEPARATION OF GASEOUS ISOTOPES

[76] Inventor: Denis B. McConnell, 41 Chelvin Dr., Georgetown, Ontario, Canada

[22] Filed: Feb. 19, 1974

[21] Appl. No.: 443,384

[30] Foreign Application Priority Data
Nov. 30, 1973 Canada............................... 187036

[52] U.S. Cl. ....................... 55/11; 55/135; 55/139; 55/151; 165/1; 310/5
[51] Int. Cl. .............................................. B03c 3/00
[58] Field of Search......... 55/2, 9, 11, 81, 101, 122, 55/135, 139, 151; 204/299; 310/5; 165/1

[56] References Cited
UNITED STATES PATENTS 2,268,134  12/1941  Cusius..................................... 55/81
3,431,441  3/1969  Shair..................................... 55/151

OTHER PUBLICATIONS

Pohl – Some Effects of Non Uniform Fields of Dielectrics in Journal of Physics, Vol. 29, No. 8, 8/58, pp. 1182–1188.

Primary Examiner—Bernard Nozick

[57] ABSTRACT

Gaseous isotopes are separated from a mixture in a vertically elongated chamber by subjecting the mixture to a non-uniform transverse electric field, thereby to effect dielectrophoretic separation of the isotopes, and producing a transverse temperature gradient in the chamber, thereby to enhance the separation by convective countercurrent flow.

13 Claims, 4 Drawing Figures

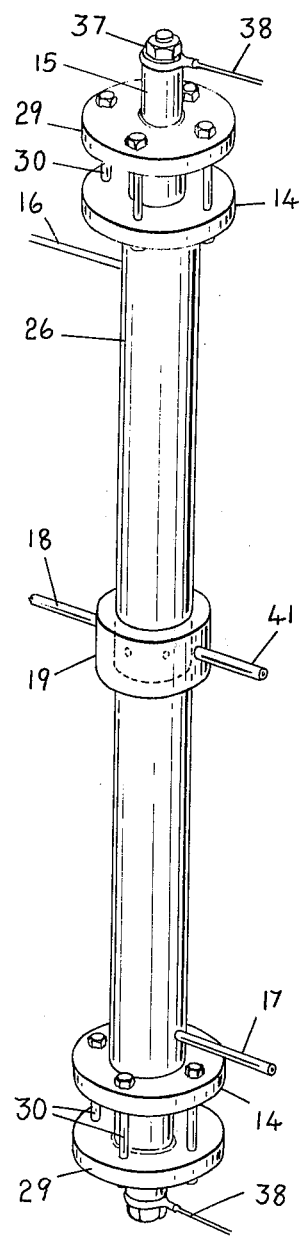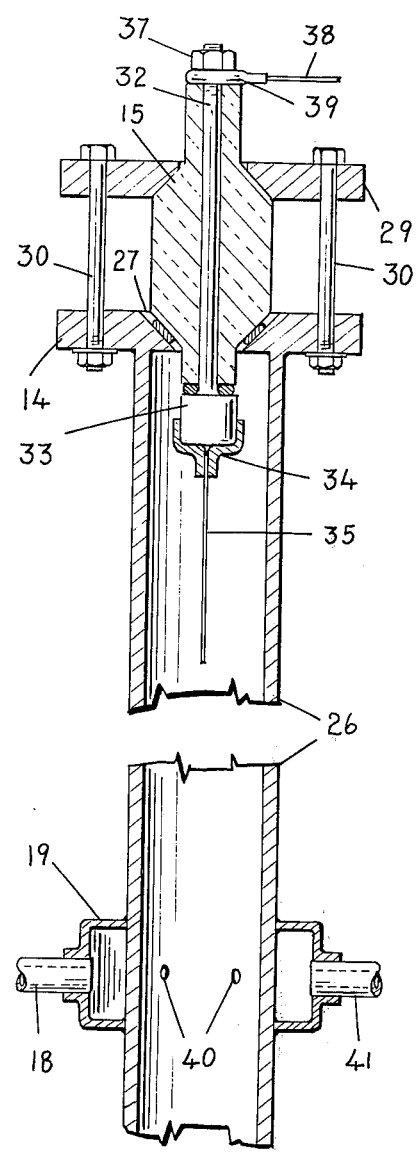

DIELECTROPHORETIC SEPARATION OF GASEOUS ISOTOPES

BACKGROUND OF THE INVENTION

This invention relates to a process for the separation of gaseous isotopes by electrophoresis and to an apparatus for use in the process. The invention is especially applicable to heavy water separation from steam, and will be described particularly in relation thereto; however, it is to be understood that the invention is broadly applicable to the separation of gaseous isotopes having different dipole moments and/or different molecular weights.

The process of the invention utilizes two well-known effects, these being the dielectrophoretic effect, and separation enhancement by convective countercurrent flow. Both effects are well known in principle, and both have been used successfully in other applications. Dielectrophoresis, for example, has been used to separate powders from liquids; convective countercurrent flow is a commonly used technique in isotope separation involving exchange reactions, such as the GS process for heavy water production. However, dielectrophoresis has not been used hitherto in isotope separation; indeed, it had not been considered hitherto that dielectrophoresis might have a practical application in the separation of very small particles, especially particles of molecular size, on account of the random thermal motions of the particles which would tend to destroy orderly separation.

The present invention, based on theoretical and experimental studies of dielectrophoresis, provides a method of isotope separation, more particularly heavy water separation, which compares favourably with known thermal diffusion methods as regards yield, but is free from certain disadvantages inherent in the latter.

SUMMARY OF THE INVENTION

The present invention is based on the discovery that the dielectrophoretic effect when assisted by convective countercurrent flow, far from being insignificant may play a highly significant part in the separation of gaseous isotopes having different dipole moments and/or different molecular weights, as for example in the production of heavy water from steam. An apparatus for carrying out the process according to the invention comprises a vertically elongated chamber, inlet means for admitting a gaseous mixture to the chamber at a position spaced from the ends of the chamber, means for producing a non-uniform transverse unidirectional electric field within the chamber, thereby to effect dielectrophoretic separation of the mixture into heavier and lighter fractions, means for producing a transverse temperature gradient within the chamber, thereby to effect vertical separation of the fractions by convective countercurrent flow, and means for extracting the enriched and depleted fraction from opposite ends of the chamber. Preferably, the chamber has a vertical axis of symmetry, the electric field and the temperature gradient being radially symmetrical in relation to the axis.

One embodiment of the invention, as applied to a process and an apparatus for the production of heavy water from steam, will now be described by way of example with reference to the accompanying drawings, in which:

FIG. 2 is a perspective view of a separating column of one stage of the apparatus;

FIG. 3 is a sectional view of a detail of the separating column; and

DESCRIPTION OF THE PREFERRED EMBODIMENT

1. General

As stated previously, the invention utilizes both the dielectrophoretic effect and separation enhancement by convective countercurrent flow. The dielectrophoretic effect arises from the forces exerted on a dipole in a non-uniform electric field. As an example one may consider a molecular dipole with an electric moment P in a field of strength E generated by a charged wire extending along the axis of a cylindrical conducting tube. The dipole becomes aligned in the direction of the field, the alignment being partly destroyed by thermal movement of the molecule, and is drawn towards a region of increasing field intensity, i.e. towards the wire; the force F acting on the dipole is given by $F = P \cdot \mathrm{grad}\, E$ The possible usefulness of this effect in isotope separation depends on the electric dipole moments of the molecules to be separated, and in heavy water production, in particular, depends on the electric dipole moments of $H_2O$ and HDO molecules. Experimental values for the moments average about $1.85 \times 10^{-18}$ esu. cm for $H_2O$ and about one-half percent smaller for HDO. Due to the randomizing effect of thermal motions in the vapour, a concentration gradient is set up whose equilibrium value is such that the number of molecules transported into a small volume by the effect of the field E is balanced by the diffusion of molecules outwards. The difference in mass of the molecules is reflected in a difference in the diffusion rates and consequently the equilibrium concentrations of the two molecular types. The difference in transport rates is a function of the original concentrations of the isotopic components of the vapour, the diffusion properties of the vapour, and the mass difference between the molecules.

For practical values of E, the net dielectrophoretic effect would be very small, but combined with the cumulative properties of a convective countercurrent flow pattern dielectrophoresis offers the real possibility of a useful degree of separation from a single unit. The geometry of the illustrated apparatus is such as to allow use of both dielectrophoresis and convective countercurrent flow.

2. The Apparatus

Figure 1:
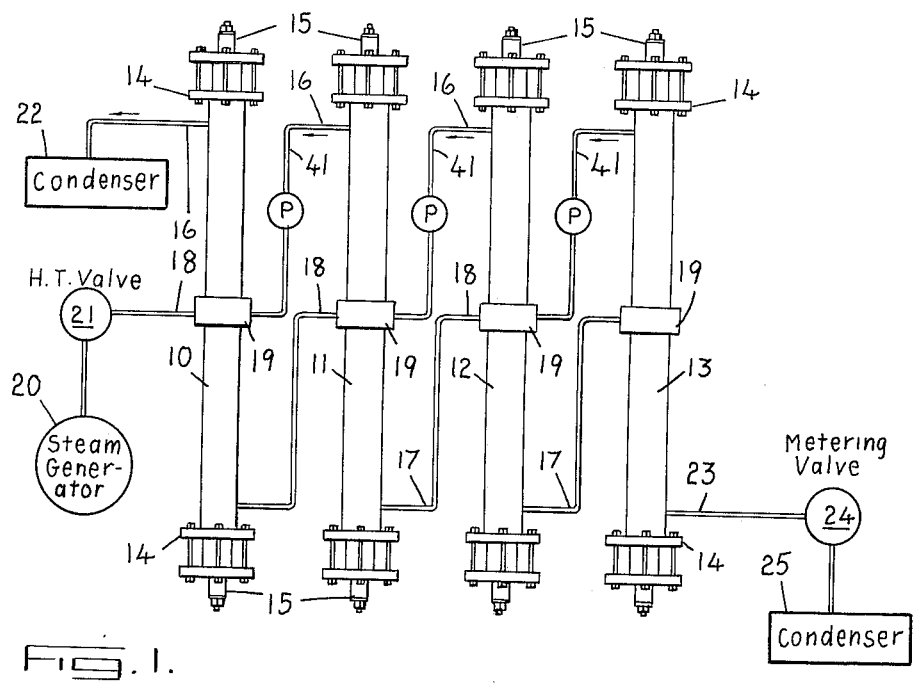
FIG. 1 is a partly diagrammatic side elevational view of the apparatus.

The apparatus illustrated in FIG. 1 comprises four separation stages, represented by the separating columns 10, 11, 12 and 13. In practice the apparatus would normally comprise many such stages, but for simplicity of illustration only four are shown in the present embodiment. Furthermore, the electrical connections have been omitted from FIG. 1, these being illustrated in FIG. 4.

Each of the separating columns comprises a vertically extending metallic tube providing an elongated chamber, the tube being closed at its ends by plates 14. As hereinafter described, insulating bushes 15 extend through the end plates 14 and house high voltage connections to the internal electrodes of the column. Ducts 16, 17 connected to the tube adjacent to its upper and lower ends provide outlets for the extraction of depleted and enriched fractions, and an inlet duct 18 is connected to a plenum 19 for feeding steam into the chamber, the plenum being positioned midway between the two outlets 16, 17. In operation, dry steam is generated in a steam generator 20, and is fed to the separating column 10 of the first stage via a high temperature control valve 21, the inlet duct 18, and the inlet plenum 19. By virtue of a transverse non-uniform electric field and a transverse temperature gradient within the chamber, electrophoretic separation of the $H_2O$ and HOD molecules is effected, and a deuterium-enriched fraction flows downwardly in the chamber while a deuterium-depleted fraction flows upwardly. The depleted fraction is extracted via the outlet duct 16 and led to a condenser 22. The enriched fraction is extracted via the bottom outlet duct 17 and led thereby to the inlet plenum of the second stage 11. In this second stage further separation is effected, the enriched fraction being extracted and led to the inlet of the third stage 12, and the depleted fraction being fed back to the inlet of the first stage 10 via a duct 41. The product thus becomes progressively more enriched at each stage of the apparatus, the final product being extracted via an outlet duct 23 and led via a metering valve 24 to a condenser 25.

The raw steam fed to the inlet of the first separating column 10 preferably has a temperature of at least 300° C and a pressure of at least 800 p.s.i. Clearly the apparatus must be capable of withstanding the high temperature and high pressure involved, and the columns and their respective inlet and outlet ducts must be thermally insulated so that dry steam is treated at each stage.

Referring now to FIGS. 2 and 3, each separating column, for example the separating column 10, comprises a honed stainless steel tube 26 having a cylindrical wall. The tube 26 is welded at each end to a circular end plate 14, the end plate having a central circular aperture 27 with a chamfered edge to accommodate an insulating bush 15. The insulating bush 15 has a middle portion of increased diameter, the ends of this middle portion being of conical shape to match the chamfered edge of the aperture 27, and also the chamfered edge of a central aperture in a clamping plate 29. The insulating bush 15 is clamped in position between the end plate 14 and the clamping plate 29, as shown in FIG. 3, these two plates being clamped together by bolts 30. In order to provide a gas-tight seal which will stand up to the high operating temperature and pressure, a gold O-ring 31 is clamped between the chamfered surfaces of the bush 15 and the end plate 14.

The insulating bush 15 is of mica-loaded glass and has an axial bore through which a stainless steel rod 32 extends. The rod 32 has a small cylindrical enlargement 33 at its lower end to which a metal cap 34 is connected. A similar metal cap (not shown) is similarly arranged at the bottom of the tube, and a straightened polished tungsten wire 35 extends between these metal caps. The wire 35 constitutes an anode of the separating column, the wall of the tube 26 constituting a cathode; these two electrodes are coaxial with one another.

In order to prevent leakage of steam along the central bore of the insulating bush 15, between the insulator and the lead-in rod 32, a second gold O-ring 36 is clamped between the cylindrical enlargement 33 and the lower end of the bush 28. The clamping force is applied by tightening a nut 37 which engages the threaded upper end of the lead-in rod 32. A lead-in conductor 38, having a terminal 39, is connected to the external end of the lead-in rod 32.

The tube 26 is formed with a ring of small holes 40 at a position midway between its ends, the holes 40 serving to admit steam to the chamber from the plenum 19, to which the inlet duct 18 and the feedback duct 41 are connected.

Figure 4:
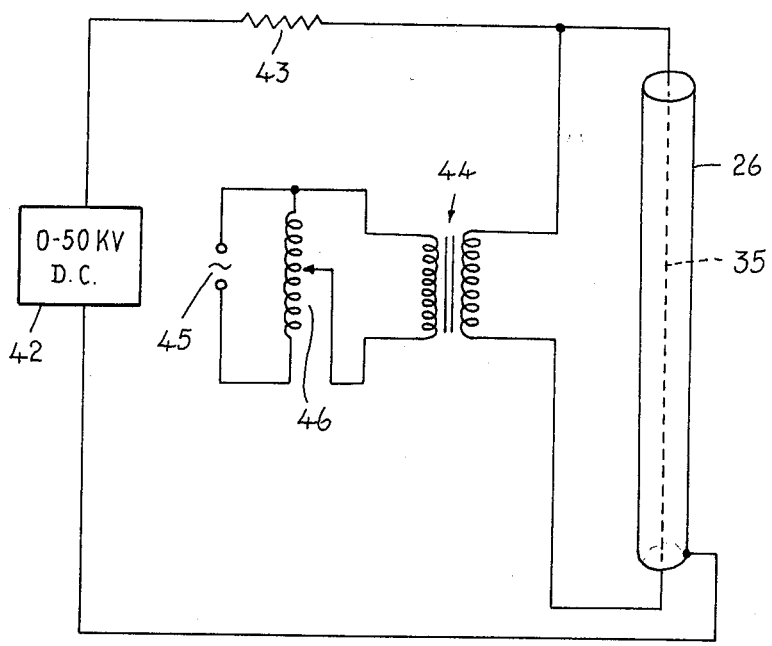
FIG. 4 is a circuit diagram showing the electrical connections to the electrodes of the column.

Referring now to FIG. 4, the electrical connections to the tungsten wire 35, constituting an anode, and to the stainless steel wall 26, constituting a cathode, are shown. A direct current source 42, providing a voltage up to 50 kV is connected between these electrodes, a limiting resistor 43 of 200 MΩ being in series with the source to prevent damage to the latter in the event of an electrical breakdown. The ends of the wire 35 are also connected across the secondary winding of a transformer 44, which is fed from an a.c. supply 45 through a variable autotransformer 46. The wire 35 acts as a resistance heating element to be heated by the current passing through it.

In operation of the system, the application of the high voltage between the electrodes 26, 35 results in the production of a non-uniform transverse electric field in the separating chamber, and the ohmic heating of the tungsten wire 35 results in the production of a transverse temperature gradient between the electrodes. In consequence of the axial symmetry of the electrodes, the electric field and the temperature gradient are radially symmetrical in relation to the common axis of the electrodes. Consequently, molecules having the smaller mass, namely the $H_2O$ molecules, tend to migrate towards the tungsten wire 35, while molecules having the greater mass namely the HOD molecules, tend to migrate towards the wall 26, the temperature gradient produced by heating of the wire resulting in downward convection of the steam nearer the wall and upward convection of the steam nearer the wire. As a result, under thermal equilibrium conditions, an isotope concentration gradient is established between the ends of the chamber, the steam towards the upper end of the chamber having a lower concentration of HOD molecules and the steam towards the lower end of the chamber having a higher concentration of HOD molecules.

It should be stated that the principle of operation would be the same if the polarities of the wire 35 and the wall 26 were reversed, that is, if the wire were made the cathode and the wall 26 were made the anode. However, such an arrangement would be less satisfactory owing to its susceptibility to electrical breakdown through arcing between the electrodes.

What I claim as my invention is:

1. A process for separating gaseous isotopes having different dipole moments and/or different molecular weights from a mixture, comprising admitting the mixture to a vertically elongated chamber, subjecting the mixture to a non-uniform transverse electric field, thereby to effect dielectrophoretic separation of the isotopes into a lighter fraction and a heavier fraction, producing a transverse temperature gradient within the chamber thereby to effect vertical separation of the fractions by convective countercurrent flow, and removing said fractions from the ends of the chamber.

2. A process according to claim 1, wherein the chamber has a vertical axis of symmetry, said electric field and said temperature gradient being radially symmetrical in relation to said axis.

3. A process for producing heavy water which comprises admitting steam to a vertically elongated chamber at a position spaced from the ends of the chamber, subjecting the steam to a non-uniform transverse electric field, thereby to effect dielectrophoretic separation of the isotopic components of the steam into deuterium-depleted and deuterium-enriched fractions, producing a transverse temperature gradient within the chamber thereby to effect vertical separation of the fractions by convective countercurrent flow, the direction of the temperature gradient being such as to effect upward flow of the deuterium-depleted fraction and downward flow of the deuterium-enriched fraction, and extracting said fractions from the upper and lower ends of the chamber, respectively.

4. A process according to claim 3, wherein the chamber has a vertical axis of symmetry, said electric field and said temperature gradient being radially symmetrical in relation to said axis.

5. A process according to claim 4, wherein the steam admitted to the chamber is dry steam.

6. A process according to claim 5, wherein the steam is admitted to the chamber at a temperature not less than 300° C and a pressure not less than 800 p.s.i.

7. A process according to claim 5, including the step of condensing the steam extracted from the bottom end of the chamber and collecting the condensed steam.

8. In a process for the production of heavy water from steam, the step of effecting dielectrophoretic separation of steam into deuterium-enriched and deuterium-depleted fractions while effecting vertical separation of said fractions by convective countercurrent flow.

9. Apparatus for separating gaseous isotopes having different dipole moments and/or different molecular weights from a mixture of the gaseous isotopes, comprising a vertically elongated chamber, inlet means for admitting mixture to the chamber at a position spaced from the ends of the chamber, means for producing a non-uniform transverse unidirectional electric field within the chamber, means for producing a transverse temperature gradient within the chamber, and first and second outlet means for extracting separated fractions of the mixture from the ends of the chamber.

10. Apparatus according to claim 9, wherein the chamber has a vertical axis of symmetry, said electric field producing means and said temperature gradient producing means being arranged to produce an electric field and a temperature gradient, respectively, which are radially symmetrical in relation to said axis.

11. Apparatus according to claim 10, wherein the chamber has an electrically conductive cylindrical wall constituting a first electrode, and electrically conductive means extending longitudinally within the chamber constituting a second electrode spaced from the first electrode, said electric field producing means comprising means for applying a unidirectional potential difference between the electrodes, and said temperature gradient producing means comprising means for effecting a temperature difference between the electrodes.

12. Apparatus for the production of heavy water comprising a vertically elongated chamber, said chamber having a vertical cylindrical metallic wall constituting a cathode, duct means connected to the chamber at a position spaced from the ends of the wall for admitting steam to the chamber, an electrically conductive wire extending longitudinally within the chamber coaxially with said wall, the wire constituting an anode, first circuit means connected between the cathode and the anode for applying a unidirectional potential difference therebetween whereby to produce a radially symmetrical transverse electric field within the chamber for effecting dielectrophoretic separation of the isotopic components of the steam into deuterium-depleted and deuterium-enriched fractions, second circuit means connected to the ends of the wire for electrically heating the wire, whereby to produce a radially symmetrical transverse temperature gradient within the chamber for effecting vertical separation of the fractions by convective countercurrent flow, and means connected to the upper and lower ends of the chamber for extracting said deuterium-depleted fraction and said deuterium-enriched fraction, respectively, from the chamber.

13. Apparatus according to claim 12, wherein the tube is of stainless steel and the wire is of tungsten.

* * * * *